United States Patent Office 3,592,935
Patented July 13, 1971

3,592,935
SUBSTITUTED BENZYLIDENE HYDRAZINES AS ANTI-INFLAMMATORY AGENTS
William J. Houlihan and Robert E. Manning, Mountain Lakes, N.J., assignors to Sandoz-Wander, Inc., Hanover, N.J.
No Drawing. Filed Dec. 11, 1969, Ser. No. 884,312
Int. Cl. A61k 27/00
U.S. Cl. 424—326                                    4 Claims

ABSTRACT OF THE DISCLOSURE

This disclosure relates to dihalobenzylidene hydrazines, e.g., N-(2,6-dichlorobenzylidene)-N'-amidino hydrazine. These compounds are useful as anti-inflammatory agents.

---

This invention relates to hydrazine derivatives. More particularly, this invention concerns substituted dihalobenzylidene hydrazines, to their methods of preparation, and to their use as anti-inflammatory agents. The invention also relates to pharmaceutical compositions containing the above compounds as an active ingredient thereof and the method of using such compositions for the treatment of inflammation.

The active agents with which this invention is concerned may be represented by the following structural formula

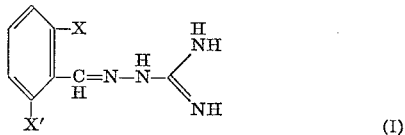

where:
X represents H chloro or fluoro; and
X' represents chloro or fluoro.

The compound of Formula I above where X and X' represent chloro, i.e., N-(2,6-dichlorobenzylidene)-N'-amidino hydrazine, is known (British Pat. 1,019,120) and the present invention only contemplates the novel use of such compound, particularly as an anti-inflammatory agent. The other compounds encompassed by Formula I are known and they too possess anti-inflammatory activity. The above-mentioned activity of these compounds is indicated by their activity in rats given 6 mg./kg. of active compound orally and tested using the acute carrageenan-induced edema procedure substantially as described by Winter (Proc. Soc. Exp. Biol., 111, 544, 1962), and in mice given 0.22 mg./kg. of active compound orally and tested using the Mouse Writhing Test substantially as described by Sigmund et al. (Proc. Soc. Exp. Bio. & Med. 95: 729, 1957), as modified by Okun et al. (J. Pharmacol. & Exper. Therop. 139: 107, 1963).

All of the compounds defined by Formula I may be prepared by treating a dihalobenzaldehyde with an acid addition salt of a substituted hydrazine or the free hydrazine. The process may be generally depicted as follows:

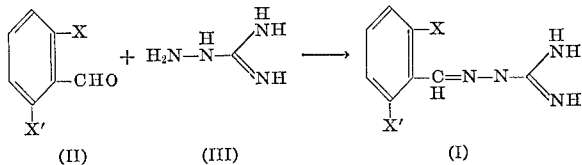

where X and X' are defined above.

In accordance with the above process the compounds of Formula I are prepared by treating the benzaldehydes of Formula II with the free base or acid salt of the substituted amines of Formula III in solvent such as alcohols, e.g., lower alkanols such as ethanol, isopropanol and the like. The reaction may be carried out at a temperature of from about 75°–150° C., preferably the reflux temperature of the reaction mixture, for about 8–48 hours. The particular solvent and temperatures used are not critical to the successful completion of the reaction. The amine acid addition salts which may be used include the strong mineral acid addition salts, e.g., the hydrogen halides such as the hydrogen chloride, hydrogen iodide or hydrogen bromide, or the carbonate, sulfate and the like. The resulting product is readily recovered by conventional techniques, e.g., filtration. When the product is recovered as an acid addition salt, it may be converted to the free base by standard techniques. The compounds of Formulas II and III are known and may be prepared according to methods disclosed in the literature.

As previously indicated, the compounds of Formula I are useful as anti-inflammatory agents. For such usage the compounds may be administered orally or parenterally as such or admixed with conventional pharmaceutical carriers. They may be administered orally in such forms as tablets, dispersible powders, granules, capsules, syrups and elixirs, and parenterally as solutions, suspensions, dispersions, emulsions, and the like; e.g., a sterile injectable aqueous suspension. The compositions for oral use contain one or more conventional adjuvants, such as sweetening agents, flavoring agents, coloring agents and preserving agents, in order to provide an elegant and palatable preparation. Tablets may contain the active ingredient in admixture with conventional pharmaceutically acceptable excipients, e.g., inert diluents, such as calcium carbonate, sodium carbonate, lactose and talc, granulating and disintegrating agents, e.g., starch and alginic acid, binding agents, e.g., starch, gelatin and acacia, and lubricating agents, e.g., magnesium stearate, stearic acid and talc. The tablets may be uncoated or coated by known techniques to delay disintegration and absorption in the grastro-intestinal tract and thereby provide a sustained action over a longer period. Similarly, suspensions, syrups and elixirs may contain the active ingredient in admixture with any of the conventional excipients utilized for the preparation of such compositions, e.g., suspending agents (methylcellulose, tragacanth and sodium alginate), wetting agents (lecithin, polyoxyethylene stearate and polyoxyethylene sorbitan mono-oleate) and preservatives (ethyl-p-hydroxybenzoate). Capsules may contain the active ingredient alone or admixed with an inert solid diluent, e.g., calcium carbonate, calcium phosphate and kaolin. The injectable compositions are formulated as known in the art and may contain appropriate dispersing or wetting agents and suspending agents identical or similar to those mentioned above. These pharmaceutical preparations may contain about 10–90% of the active ingredient in combination with the carrier or adjuvant. Furthermore, these compounds of Formula I may be similarly administered in the form of their non-toxic pharmaceutically acceptable acid addition salts. Such salts possess the same order of activity as the free base, are readily prepared by reacting the base with an appropriate acid and accordingly are included within the scope of the invention. Representative of such salts are the mineral acid salts, such as the hydrochloride, hydrobromide, sulfate, phosphate and the like and the organic acid salts, such as the succinate, benzoate, acetate, p-toluenesulfonate, benzene-sulfonate maleate, maleate, tartrate, methanesulfonate, cyclohexylsulfamate and the like.

The dosage of active ingredient employed for the alleviation of inflammation may vary depending on the particular compound employed and the severity of the condition being treated. However, in general, satisfactory results are obtained when the compounds (I) are administered at a daily dosage of from about 0.05 milligram to about 25 milligrams per kilogram of animal body weight, preferably given in divided doses two to four times a day, or in sustained release form. For most large mammals, the total daily dosage is from about 4 to about 200 milligrams. Dosage forms suitable for internal use comprise from about 1 to about 100 milligrams of the active compound.

The preferred pharmaceutical compositions from the standpoint of preparation and ease of administration are solid compositions, particularly hard-filled capsules and tablets.

The following examples are provided for the purpose of illustration and not by way of limitation. They are not intended so as to limit the scope of the invention as defined in the appended claims.

EXAMPLE 1

N-(2,6-dichlorobenzylidene)-N'-amidino hydrazine

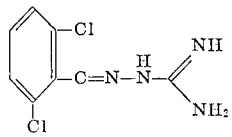

A mixture of 8.8 g. (0.05 mole) of 2,6-dichlorobenzaldehyde, 6.8 g. (0.05 mole) amindinohydrazine (amino guanidine) carbonate and 150 ml. of ethanol is stirred and refluxed for 18 hours. The clear solution is cooled to room temperature and the resultant solid is filtered off to give N - (2,6 - dichlorobenzylidene)-N'-amidino hydrazine; M.P. 237–238° C. with decomposition. When the above process is carried out and 2-chlorobenzaldehyde, 2-fluorobenzaldehyde, 2,6 - difluorobenzaldehyde or 2-chloro-6-fluorobenzaldehyde is used in place of 2,6-dichlorobenzaldehyde, there is obtained N-(2 - chlorobenzylidene)-N'-amidino hydrazine, N-(2-fluorobenzylidene)N'-amidino hydrazine, M.P. 187°–189° C., N-(2,6-difluorobenzylidene-N'-amidino hydrazine, M.P. 200°–202° C., or N-(2-chloro - 6-fluorobenzylidene)-N'-amidino hydrazine, respectively.

EXAMPLE 2

Tablets

Tablets suitable for oral administration which contain the following ingredients may be prepared by conventional tabletting techniques. Such tablets are useful in treating inflammation at a dose of one tablet 2 to 4 times a day.

| Ingredient: | Parts by wt. |
|---|---|
| N - (2,6 - dichlorobenzylidene)N'-amidino hydrazine | 50 |
| Tragacanth | 2 |
| Lactose | 39.5 |
| Corn starch | 5 |
| Talcum | 3 |
| Magnesium stearate | 0.5 |

EXAMPLE 3

Dry filled capsules

Capsules suitable for oral administration which contain the following ingredients are prepared in a conventional manner. Such capsules are useful in treating inflammation at a dose of one capsule 2–4 times a day.

| Ingredient: | Parts by wt. |
|---|---|
| N - (2,6 - dichlorobenzylidene)-N'-amidino hydrazine | 50 |
| Inert solid diluent (starch, lactose, kaolin) | 450 |

EXAMPLE 4

Sterile solution for injection

The following ingredients are dissolved in water for injection. The resulting solution is filtered through an appropriate medium to render a clear solution. The solution is then autoclaved to render it sterile.

| Ingredient: | Parts by wt. |
|---|---|
| N-(2,6-dichlorobenzylidene)-N'-amidino hydrazine | 10. |
| Sodium alginate | 0.5. |
| Buffer system | As desired. |
| Lecithin | 0.5. |
| Sodium chloride | As desired. |
| Water for injection | To desired volume. |

What is claimed is:

1. A method for treating inflammation which comprises orally or parenterally administering to a mammal suffering from inflammation an anti-inflammatory effective amount of a compound of the formula

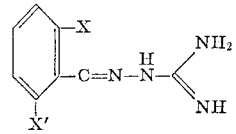

where

X represents H, chloro or fluoro; and
X' represents chloro or fluoro;

or a non-toxic pharmaceutically acceptable acid addition salt thereof.

2. A method according to claim 1 wherein the compound is N-(2,6 - dichlorobenzylidene)-N'-amidino hydrazine or a non-toxic pharmaceutically acceptable acid addition salt thereof.

3. A method according to claim 2 wherein the compound is administered at a daily dose of from about 0.05 milligram to about 25 milligrams.

4. A method according to claim 2 wherein the compound is administered in a unit dosage form comprising said compound to the extent of from about 1 milligram to about 100 milligrams per unit dosage.

References Cited

UNITED STATES PATENTS

| 3,091,574 | 5/1963 | Coletta et al. | 424—79 |
| 3,271,448 | 9/1966 | Augstein et al. | 424—326 |
| 3,377,245 | 4/1966 | Fielden et al. | 424—326 |

FOREIGN PATENTS

| 1,019,120 | 2/1966 | Great Britain | 260—564F |
| 439,917 | 10/1966 | France | 260—564F |
| 958,832 | 2/1957 | Germany | 260—564F |

OTHER REFERENCES

Derwent Farmdoc #26776, Abstracting South African Patent #66–6480, Published March 29, 1967.

JEROME D. GOLDBERG, Primary Examiner